US008355347B2

(12) United States Patent
Boers et al.

(10) Patent No.: US 8,355,347 B2
(45) Date of Patent: Jan. 15, 2013

(54) CREATING MULTIPOINT-TO-MULTIPOINT MPLS TREES IN AN INTER-DOMAIN ENVIRONMENT

(75) Inventors: Arjen Boers, Sitges (ES); IJsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 766 days.

(21) Appl. No.: 11/960,187

(22) Filed: Dec. 19, 2007

(65) Prior Publication Data

US 2009/0161583 A1    Jun. 25, 2009

(51) Int. Cl.
*H04L 12/28* (2006.01)
(52) U.S. Cl. .................. 370/256; 370/390; 370/401
(58) Field of Classification Search .......... 370/389, 370/392, 254–256, 390, 401; 709/228
See application file for complete search history.

(56) References Cited

U.S. PATENT DOCUMENTS

| | | | |
|---|---|---|---|
| 6,466,985 B1 | 10/2002 | Goyal et al. | |
| 6,661,789 B1* | 12/2003 | Cankaya et al. | 370/390 |
| 7,039,687 B1 | 5/2006 | Jamieson et al. | |
| 7,489,695 B1* | 2/2009 | Ayyangar | 370/396 |
| 7,630,322 B2* | 12/2009 | Mohr | 370/252 |
| 2004/0028064 A1* | 2/2004 | Cetin et al. | 370/409 |
| 2004/0143672 A1* | 7/2004 | Padmanabham et al. | 709/231 |
| 2004/0205239 A1* | 10/2004 | Doshi et al. | 709/241 |
| 2005/0027782 A1 | 2/2005 | Jalan et al. | |
| 2006/0002370 A1 | 1/2006 | Rabie et al. | |
| 2006/0002408 A1 | 1/2006 | Ould-Brahim | |
| 2006/0198321 A1* | 9/2006 | Nadeau et al. | 370/254 |
| 2006/0221867 A1 | 10/2006 | Wijnands et al. | |
| 2006/0221950 A1 | 10/2006 | Heer | |
| 2006/0221958 A1* | 10/2006 | Wijnands et al. | 370/389 |
| 2007/0091827 A1 | 4/2007 | Boers et al. | |
| 2007/0104194 A1 | 5/2007 | Wijnands et al. | |
| 2007/0140107 A1 | 6/2007 | Eckert et al. | |
| 2007/0174483 A1 | 7/2007 | Raj et al. | |
| 2007/0177525 A1 | 8/2007 | Wijnands et al. | |
| 2007/0177527 A1* | 8/2007 | Bragg et al. | 370/256 |
| 2007/0217420 A1* | 9/2007 | Raj et al. | 370/392 |
| 2007/0253416 A1* | 11/2007 | Raj | 370/390 |
| 2007/0280276 A1 | 12/2007 | Sadler et al. | |
| 2008/0080507 A1 | 4/2008 | Swallow et al. | |
| 2008/0123650 A1 | 5/2008 | Bhaskar | |
| 2008/0159311 A1 | 7/2008 | Martinotti et al. | |
| 2008/0253367 A1* | 10/2008 | Ould-Brahim | 370/389 |
| 2009/0086644 A1* | 4/2009 | Kompella et al. | 370/248 |

OTHER PUBLICATIONS

Multicast Extentions for Ldp.*
MPLS Configuration on Cisco IOS Software, Chapter 11, Introduction to Layer 2 VPNs.*

* cited by examiner

*Primary Examiner* — Dang Ton
*Assistant Examiner* — Mandish Randhawa
(74) *Attorney, Agent, or Firm* — BainwoodHuang

(57) ABSTRACT

In one embodiment, a method is provided. A first root node of a first Multipoint-to-Multipoint (MP2MP) Multi-Protocol Label Switching (MPLS) tree, advertises to a second root node of a second MP2MP MPLS tree a first label for the second root node to use to send multicast traffic to the first MP2MP MPLS tree. The first root node receives a second label from the second root node for the first root node to use to send multicast traffic to the second MP2MP MPLS tree. Communications are carried out between the first MP2MP MPLS tree and the second MP2MP MPLS tree using the first label and the second label. In another embodiment, apparatus are also provided.

11 Claims, 5 Drawing Sheets

| Incoming port | Incoming Label | Outgoing Ports | Outgoing Labels |
|---|---|---|---|
| 102(a) | L1 | 102(b) | L2 |
| | | 102(c) | L3 |
| | | 106 | L4 |
| | L30 | 102(b) | L31 |
| | | 102(c) | L32 |
| | L50 | 102(c) | L51 |
| | | 106 | L52 |
| 102(b) | L5 | 102(a) | L6 |
| | | 102(c) | L3 |
| | | 106 | L4 |
| | L33 | 102(a) | L34 |
| | | 102(c) | L32 |
| 102(c) | L7 | 102(a) | L6 |
| | | 102(b) | L2 |
| | | 106 | L4 |
| | L35 | 102(a) | L34 |
| | | 102(b) | L31 |
| | L53 | 102(a) | L54 |
| | | 106 | L52 |
| 106 | L8 | 102(a) | L6 |
| | | 102(b) | L2 |
| | | 102(c) | L3 |
| | L55 | 102(a) | L54 |
| | | 102(b) | L51 |

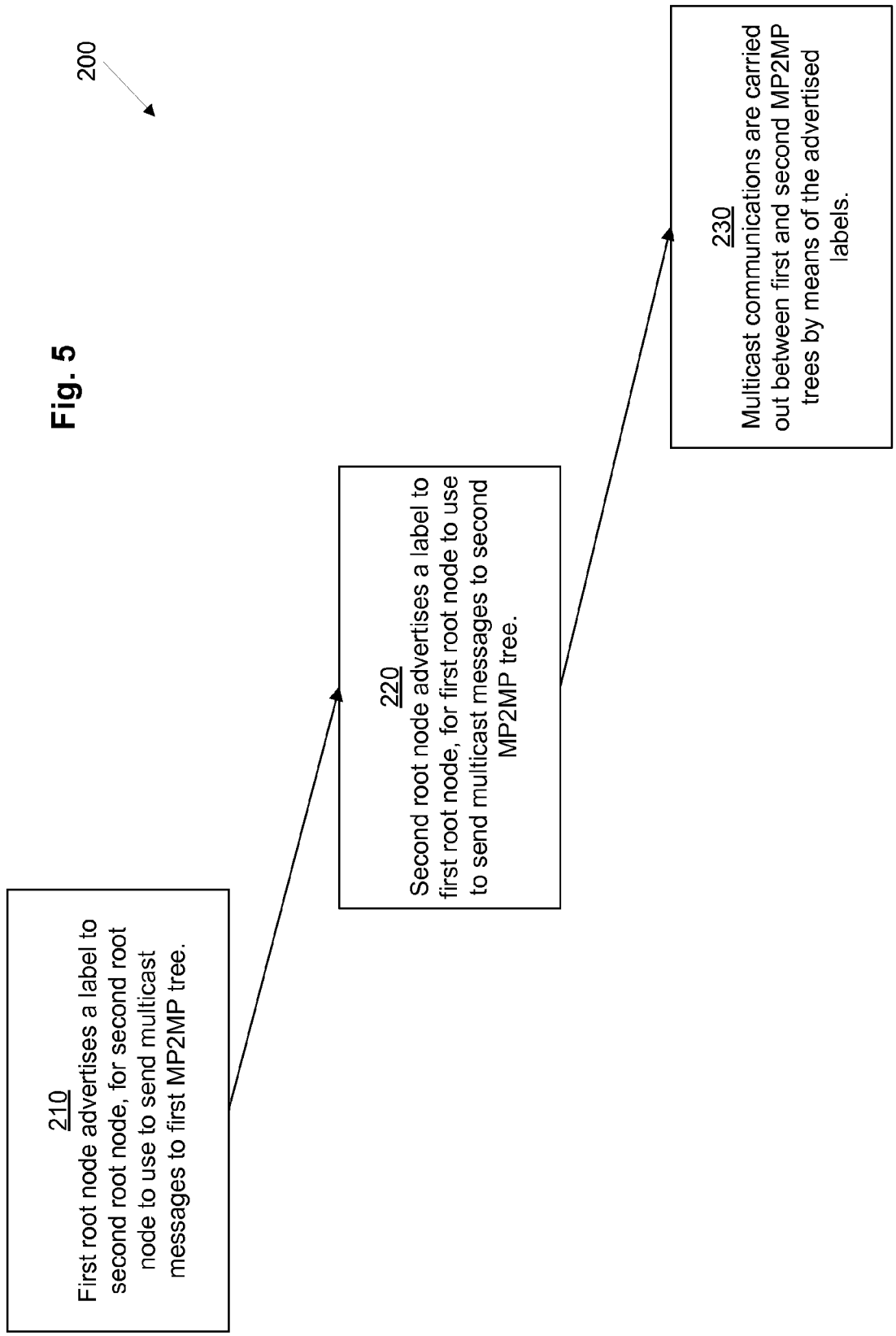

CREATING MULTIPOINT-TO-MULTIPOINT MPLS TREES IN AN INTER-DOMAIN ENVIRONMENT

TECHNICAL FIELD

The present disclosure relates generally to computer networking, and more particularly to multicast communications.

BACKGROUND

Many businesses with large computer networks opt to use third-party provider networks rather than create a private network spanning large distances at potentially prohibitive cost. These third-party provider networks should be able to provide the ability for multicast transmissions. In one approach, a business may utilize a third-party provider network using Multi-Protocol Label Switching (MPLS). Multicast transmissions may be handled by the creation and use of a Multi-Point to Multi-Point (MP2MP) MPLS tree.

An MP2MP MPLS tree is a set of network nodes (e.g., computers, routers, hubs, switches), with one root node, and one or more child nodes connected either directly or indirectly to the root node. Every child node is either directly connected to the root node or to at least one other child node to enable communications with the root node. MPLS Label-Switched Paths (LSPs) are set up to allow messages to be multicast to all nodes of the MP2MP MPLS tree. In such a tree, MPLS routers within the third-party provider network replicate multicast transmissions based on a set of LSPs through the network. Each MPLS router sends multicast transmissions up the tree towards a root node as well as down the tree to nodes downstream from the router. Each MP2MP MPLS tree has one root node. A similar approach is described in pending U.S. Patent Application Publication No. 2006/0221867 (Wijnands, et al.), entitled "Building Multipoint-to-Multipoint Label Switch Paths."

BRIEF DESCRIPTION OF THE DRAWINGS

Objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 illustrates a Forwarding Information Base (FIB) of a root node of one embodiment.

FIG. 5 illustrates a method of one embodiment.

DETAILED DESCRIPTION

Overview

In one example embodiment, a first root node of a first MP2MP MPLS tree, advertises to a second root node of a second MP2MP MPLS tree a first label for the second root node to use to send multicast traffic to the first MP2MP MPLS tree. The first root node receives a second label from the second root node for the first root node to use to send multicast traffic to the second MP2MP MPLS tree. Communications are carried out between the first MP2MP MPLS tree and the second MP2MP MPLS tree using the first label and the second label.

In another example embodiment, an apparatus includes (a) a first network interface, the first network interface connecting to a child node, (b) a second network interface, the second network interface connecting to a peer node over a directed Label Distribution Protocol (LDP) session, (c) memory, the memory including a Forwarding Information Base, and (d) a controller. The controller is configured to (i) serve as a root node for a first MP2MP MPLS tree, (ii) advertise to the peer node a first MPLS label, the first MPLS label identifying the first MP2MP MPLS tree, and (iii) receive from the peer node a second MPLS label identifying a second MP2MP MPLS tree, the peer node serving as a root node for the second MP2MP MPLS tree.

DESCRIPTION OF EXAMPLE EMBODIMENTS

If a business wishes to spread its network across the third-party provider networks of two or more service providers (e.g., if the business uses Verizon service in North America, but MCI service in Europe), then it is not obvious where to place the root node for an MP2MP MPLS tree for multicast communications. Because many service providers wish to maintain control of their own root nodes, it may not be possible to place a single root node. Thus, in one embodiment, a root node may be placed in each service provider's domain. Each root node maintains its own separate MP2MP MPLS tree. These multiple MP2MP MPLS trees are then stitched together to form a super-MP2MP MPLS tree encompassing the MP2MP MPLS trees of all service providers.

Figure 1:
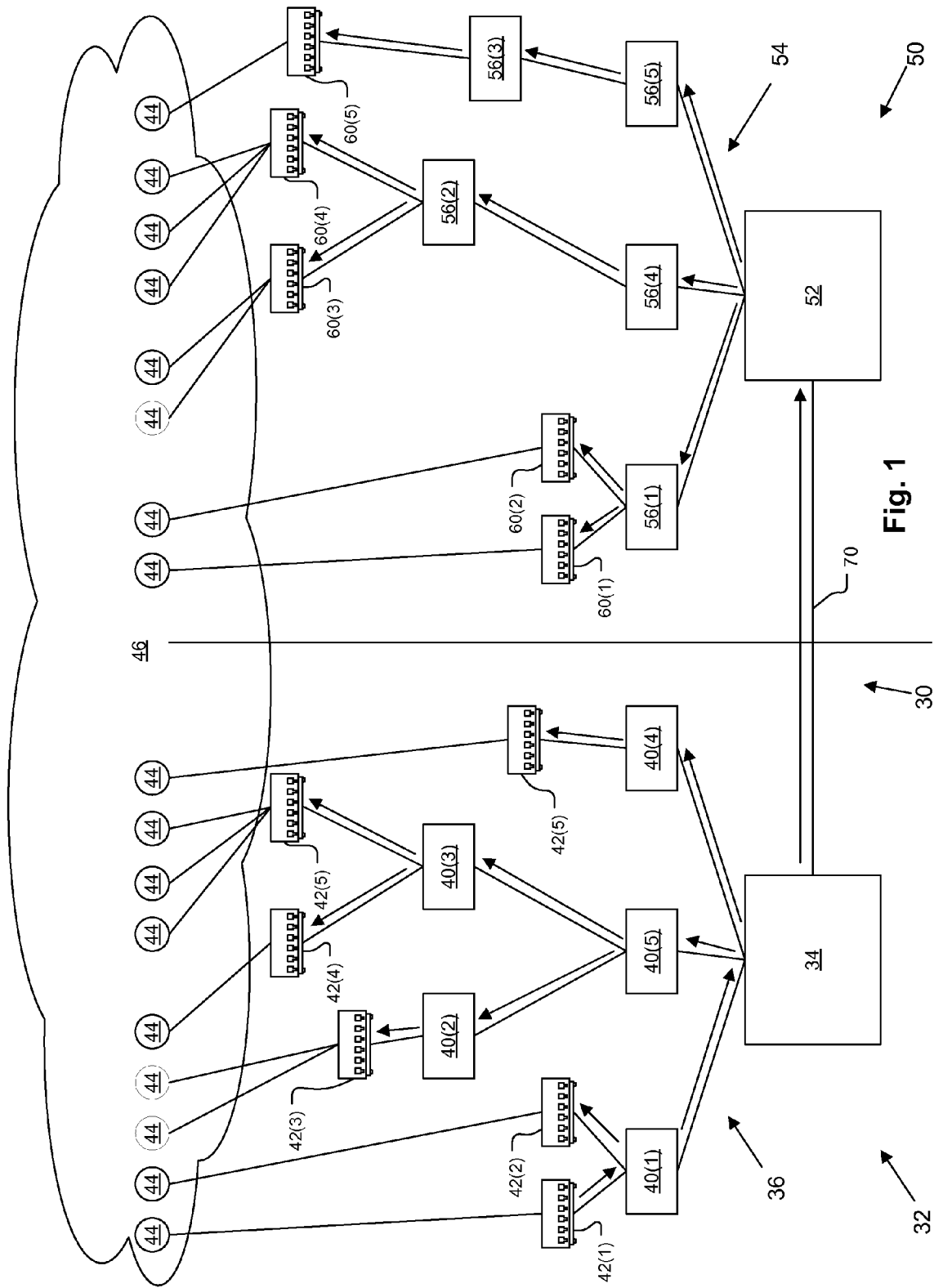
FIG. 1 illustrates a stitched Multipoint-to-Multipoint (MP2MP) Multi-Protocol Label Switching (MPLS) tree of one embodiment.

FIG. 1 depicts a stitched MP2MP MPLS tree 30 of one embodiment. First service provider network 32 contains first root node 34, which controls first MP2MP MPLS tree 36. First MP2MP MPLS tree 36 contains one or more label switch routers (LSRs) 40. Some of the LSRs 40 are provider edge routers 40(1), 40(2), 40(3), 40(4), and some are core LSRs 40(5). Each provider edge router connects to a customer edge router 42, which in turn connects to one or more network elements 44 of the customer network 46. These network elements may be, for example, computers, routers, servers, etc.

It should be noted that the customer edge router and the provider edge router functionality can be provided by a single router. Further, a network element 44 can also serve as an edge router. The provider edge routers 42 provide access to the service provider's network 32 which can contain data transmission lines, network router elements, and OSI Level 2 network devices to aid in the transmission of data from one provider edge router to another provider edge router. Transmission of data between provider edge routers may take place via core LSRs.

FIG. 1 also depicts a second service provider network 50 containing second root node 52, which controls second MP2MP MPLS tree 54. Second MP2MP MPLS tree 54 contains one or more LSRs 56. Some of the LSRs 56 are provider edge routers 56(1), 56(2), 56(3) and some are core LSRs 56(4), 56(5). Each provider edge router connects to a customer edge router 60, which in turn connects to one or more network elements 44 of the customer network 46.

A directed Label Distribution Protocol (LDP) session 70 interconnects the two root nodes 34, 52. The directed LDP session 70 may be an indirect connection. For example, one or more computers, routers, switches, etc. may interpose between the first root node 34 and the second root node 52.

Figure 2:
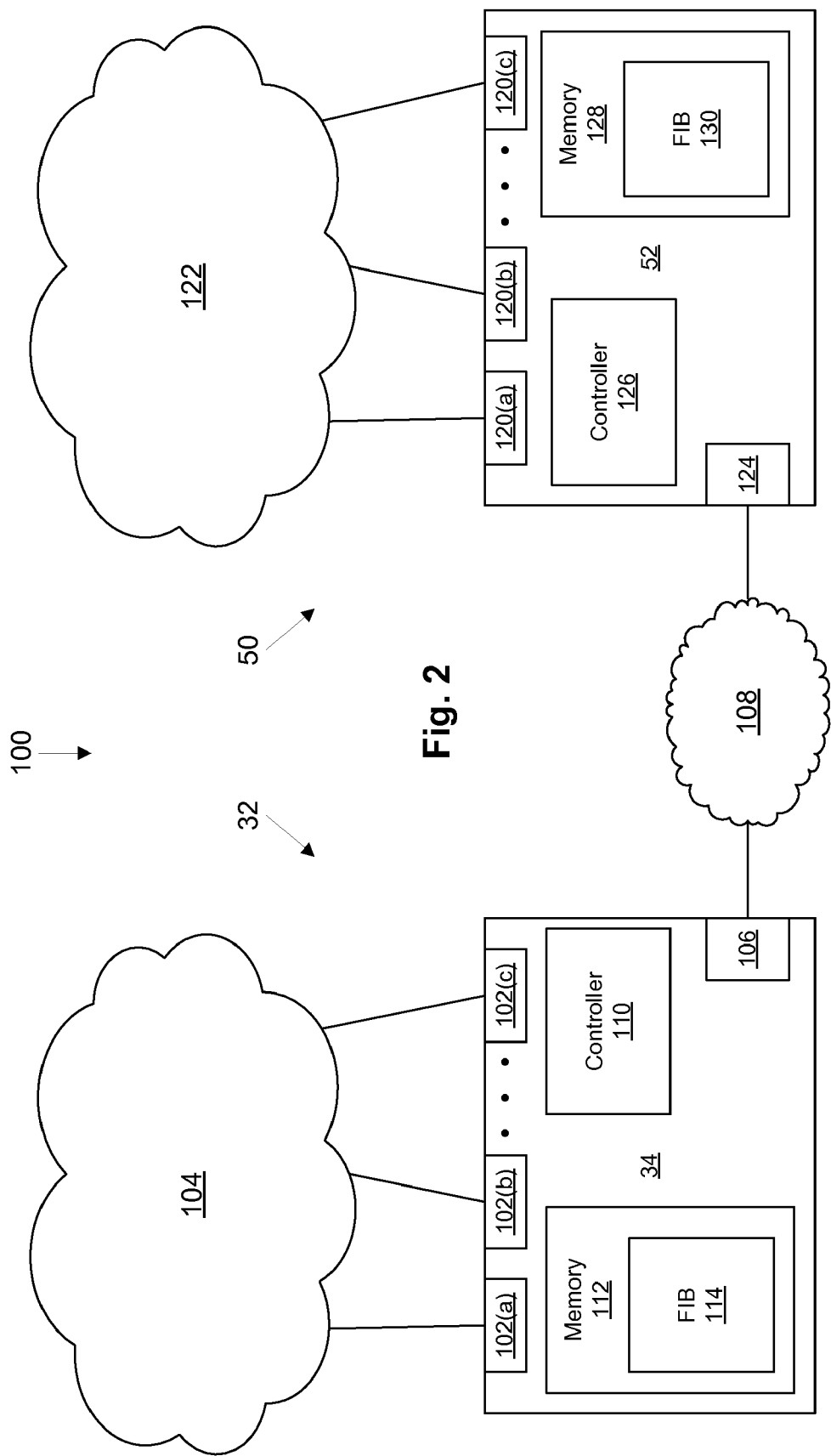
FIG. 2 illustrates a system for use in practicing one embodiment.

FIG. 2 depicts a system 100 for use in practicing one embodiment. First service provider network 32 contains first root node 34, which controls several MP2MP MPLS trees. Second service provider network 50 contains second root node 52, which controls several additional MP2MP MPLS trees. First root node 34 has one or more network interfaces 102 for connecting to the remainder of its service provider network 104 (excluding the first root node itself), a network interface 106 for connecting to an intermediary network 108 (for example, the Internet) to connect to the second service provider network 50, a controller 110, and memory 112. Memory 112 stores a Forwarding Information Base (FIB) 114. Second root node 52 also has one or more network interfaces 120 for connecting to the remainder of its service provider network 122 (excluding the second root node itself), a network interface 124 for connecting to the intermediary network 108 to connect to the first service provider network 32, a controller 126, and memory 128. Memory 128 stores a FIB 130.

Network interfaces 102, 106, 120, 124 may be, for example, Asynchronous Transfer Mode (ATM) interfaces. They may also be any other type of network interface such as Ethernet or TokenRing.

Figure 3:
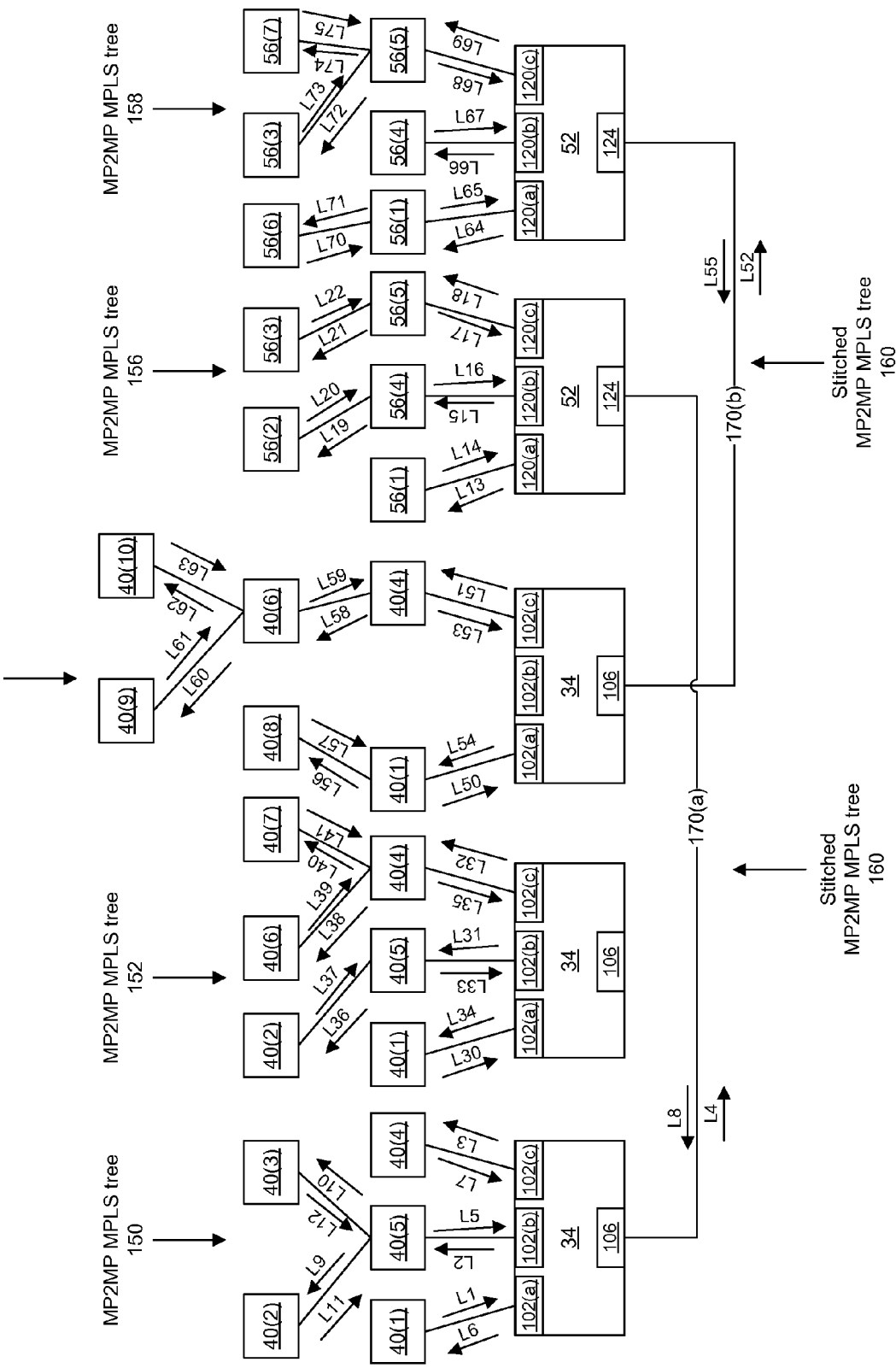
FIG. 3 illustrates Multipoint-to-Multipoint (MP2MP) Multi-Protocol Label Switching (MPLS) trees served by root nodes in one embodiment.

FIG. 3 illustrates several MP2MP MPLS trees served by first and second root nodes 34, 52 in one embodiment. MP2MP MPLS trees 150, 152, 154 are served by first root node 34. MP2MP MPLS trees 156, 158 are served by second root node 52. MP2MP MPLS tree 150 connects to MP2MP MPLS tree 156 via directed LDP session 170(a), while MP2MP MPLS tree 154 connects to MP2MP MPLS tree 158 via directed LDP session 170(b). MP2MP MPLS tree 152 does not connect to any MP2MP MPLS trees served by the second root node 52 by directed LDP session.

In one embodiment, the MP2MP MPLS trees are each operated for particular client companies. For example, MP2MP MPLS tree 150 may be operated by Verizon on behalf of the American branch of Company A, MP2MP MPLS tree 152 may be operated by Verizon on behalf of the American branch of Company B, and MP2MP MPLS tree 154 may be operated by Verizon on behalf of the American branch of Company C, while MP2MP MPLS tree 156 may be operated by MCI on behalf of the European branch of Company A, and MP2MP MPLS tree 158 may be operated by MCI on behalf of the European branch of Company C. Thus, company A has stitched MP2MP MPLS tree 160, which includes MP2MP MPLS trees 150 and 156, while company C has stitched MP2MP MPLS tree 162, which includes MP2MP MPLS trees 154 and 158. Company B's network does not extend beyond the Verizon network, and thus Company B does not require a stitched MP2MP MPLS tree.

FIG. 4 depicts an FIB 114 of, for example, first root node 34 of one embodiment. Packets entering first root node 34 over network interface 102(a) having label L1 are intended for MP2MP MPLS tree 150 and linked MP2MP MPLS tree 156. Thus, packets entering on that interface with that label are sent over network interface 102(b) with label L2 and over network interface 102(c) with label L3. In addition, the packet is forwarded across directed LDP session 170(a) through network interface 106 with label L4.

But, packets entering first root node 34 over network interface 102(a) having label L30 are intended for MP2MP MPLS tree 152. Therefore these packets are sent over network interface 102(b) with label L31 and over network interface 102(c) with label L32.

Packets entering first root node 34 over network interface 102(a) having label L50 are intended for MP2MP MPLS tree 154 and linked MP2MP MPLS tree 158. Therefore these packets are sent over network interface 102(c) with label L51 and across directed LDP session 170(b) through network interface 106 with label L52.

Additional details of the forwarding are omitted from this description, but are provided in FIG. 4, depicting FIB 114.

FIG. 5 illustrates a method 200 of one embodiment. In step 210 first root node 34 advertises to second root node 52 a label L8 for the second root node 52 to use in sending traffic intended for MP2MP MPLS tree 150. This is done by first setting up a directed LDP session 170(a) between first root node 34 and second root node 52 over pre-existing point-to-point connections between the two root nodes 34, 52. Then first root node 34 sends the label L8 across the directed LDP session 170(a) to the second root node 52 using LDP. This label L8 represents a forwarding equivalency class for all packets directed towards MP2MP MPLS tree 150.

In step 220, second root node 52 advertises to first root node 34 a label L4 for the first root node 34 to use in sending traffic intended for MP2MP MPLS tree 156. Second root node 52 sends the label L4 across the directed LDP session 170(a) to the first root node 34 using LDP. This label L4 represents a forwarding equivalency class for all packets directed towards MP2MP MPLS tree 156. First root node 34 places this label L4 into its local FIB 114, indicating that all traffic on stitched MP2MP MPLS tree 160 is to be forwarded over directed LDP session 170(a) with label L4.

In step 230, multicast communications are carried out between MP2MP MPLS tree 150 and MP2MP MPLS tree 156 using the exchanged labels L4, L8. For example, when first root node receives a multicast packet over interface 102(a) having label L1, that means that the packet is to be multicast to all nodes within stitched MP2MP MPLS tree 160. Thus, first root node 34 replicates the multicast packet and sends it to all child nodes of MP2MP MPLS tree 150 as in a standard MP2MP MPLS tree setup. First root node also sends a replicated multicast packet across interface 106 to one or more peer nodes. A peer node is a root node in a second provider network, allowing MP2MP MPLS trees to be stitched together across provider networks. As depicted in the figures, the peer node is second root node 52 so that the packet may be multicast to members of stitched MP2MP MPLS tree 160 on second provider network 50 (i.e., to all members of MP2MP MPLS tree 156). This is accomplished by referring to FIB 114, see FIG. 4.

The arrows in FIG. 1 indicate the path that a packet starting from first MP2MP MPLS tree 36 customer edge router 42(1) takes across first MP2MP MPLS tree 36 and second MP2MP MPLS tree 54 to traverse stitched MP2MP MPLS tree 30. The packet first goes to provider edge LSR 40(1), where it is replicated and transmitted to customer edge router 42(2) and to first root node 34. At first root node 34, the packet is replicated and transmitted to core LSR 40(5), provider edge LSR 40(4). These are further transmitted by LSRs 40(4) and 40(5) as in a standard MP2MP MPLS tree.

First root node also transmits the packet across directed LDP session 70 to second root node 52 of second MP2MP MPLS tree 54, where second root node 52 transmits the packet to the entire second MP2MP MPLS tree 54 as in a standard MP2MP MPLS tree.

While various embodiments of the invention have been particularly shown and described, it will be understood by those skilled in the art that various changes in form and details may be made therein without departing from the spirit and scope of the invention as defined by the appended claims.

What is claimed is:

1. A method comprising:
   at a first root node of a first Multipoint-to-Multipoint (MP2MP) Multi-Protocol Label Switching (MPLS) tree, advertising to a second root node of a second MP2MP MPLS tree a first label for the second root node to use to send multicast traffic to the first MP2MP MPLS tree, the first root node being distinct from the second root node and the first MP2MP MPLS tree being distinct from the second MP2MP MPLS tree;
   at the first root node, receiving a second label from the second root node for the first root node to use to send multicast traffic to the second MP2MP MPLS tree; and
   carrying out communications between the first MP2MP MPLS tree and the second MP2MP MPLS tree using the first label and the second label, wherein carrying out communications includes:
      at the first root node, receiving a communications packet from a child node of the first MP2MP MPLS tree for multicast distribution to a stitched MP2MP MPLS tree, the stitched MP2MP MPLS tree including the first MP2MP MPLS tree and the second MP2MP MPLS tree, the packet having a third label; and
      at the first root node, replicating the communications packet and forwarding the replicated communications packet with the second label to the second root node for multicast distribution to the second MP2MP MPLS tree;
   wherein the method further comprises establishing a directed Label Distribution Protocol (LDP) session between the first root node and the second root node over a first Point-to-Point (P2P) Label Switched Path (LSP) and a second P2P LSP;
   wherein advertising to the second root node the first label includes sending the first label over the directed LDP session via the first P2P LSP; and
   wherein receiving the second label from the second root node includes receiving the second label over the directed LDP session via the second P2P LSP;
   wherein the first MP2MP MPLS tree is under control of a first service provider;
   wherein the second MP2MP MPLS tree is under control of a second service provider, the first service provider and the second service provider being distinct; and
   wherein establishing the directed LDP session between the first root node and the second root node over the first P2P LSP and the second P2P LSP includes establishing the directed LDP session as an inter-domain session between the first service provider and the second service provider.

2. A method as in claim 1 wherein the method further comprises:
   at the first root node, advertising a forwarding equivalency class to the second root node with which to identify the stitched MP2MP MPLS tree.

3. A method as in claim 1 wherein carrying out communications further includes:
   receiving, at the first root node from the second root node over the directed Label Distribution Protocol (LDP) session between the first root node and the second root node, a packet having the first label;
   replicating the packet and sending the replicated packet with a fourth label to the child node of the first MP2MP MPLS tree.

4. A method as in claim 3 wherein:
   the first label identifies the first MP2MP MPLS tree; and
   carrying out communications further comprises looking up the first label in a Forwarding Information Base to obtain the third label.

5. A method as in claim 1 wherein:
   the second label identifies the second MP2MP MPLS tree; and
   carrying out communications further comprises looking up the third MPLS label in a Forwarding Information Base to obtain the second label.

6. A method as in claim 1 wherein carrying out communications further includes:
   at the first root node, receiving another communications packet from the second root node, the other communications packet having the first label;
   at the first root node, replicating the communications packet and multicasting the other communications packet to all child nodes of the first MP2MP MPLS tree.

7. A method as in claim 1 wherein carrying out communications further includes:
   at the first root node, receiving another communications packet from the child node of the first MP2MP MPLS tree for multicast distribution to another stitched MP2MP MPLS tree, the other stitched MP2MP MPLS tree including the first MP2MP MPLS tree and a third MP2MP MPLS tree distinct from the first and second MP2MP MPLS trees, the packet having a fourth label distinct from the third label;
   at the first root node, replicating the communications packet and forwarding the replicated communications packet with a fifth label to the third MP2MP MPLS tree for multicast distribution to the third MP2MP MPLS tree, the fifth label being distinct from the second label.

8. A method as in claim 1 wherein advertising the first label to the second root node of the second MP2MP MPLS tree and carrying out communications between the first MP2MP MPLS tree and the second MP2MP MPLS tree using the first label and the second label are both performed over a same network connection of the first root node.

9. A method as in claim 1 wherein the method further includes:
   receiving from the second root node a fourth MPLS label identifying a third MP2MP MPLS tree, the second root node serving as a root node for the third MP2MP MPLS tree, the third MP2MP MPLS tree being distinct from the first MP2MP MPLS tree and the second MP2MP MPLS tree;
   receiving another communications packet from the child node having a fifth MPLS label; and
   replicating the other communications packet and sending the replicated other communications packet to the second root node with the fourth MPLS label;
   wherein the fourth MPLS label and the fifth MPLS label are both distinct from the first, second, and third MPLS labels.

10. An apparatus comprising:
   a first network interface, the first network interface connecting to a child node;
   a second network interface, the second network interface connecting to a peer node over a directed Label Distribution Protocol (LDP) session;
   memory, the memory including a Forwarding Information Base; and
   a controller, the controller being configured to perform a method as in claim 1.

11. An apparatus comprising:
a first network interface, the first network interface connecting to a child node;
a second network interface, the second network interface connecting to a peer node over a directed LDP session; memory, the memory including a Forwarding Information Base; and
means for performing a method as in claim 1.

* * * * *